April 1, 1958

A. C. ANDERSON ET AL

2,828,598

RECIPROCATING CUTTING ASSEMBLY WITH
HYDRAULIC CONTROL MEANS

Filed April 1, 1953

Inventors:
Arthur C. Anderson
Tengel Andersen
by their Attorneys
Howson & Howson United States Patent Office 2,828,598
Patented Apr. 1, 1958

2,828,598

RECIPROCATING CUTTING ASSEMBLY WITH HYDRAULIC CONTROL MEANS

Arthur C. Anderson and Tengel Andersen, Wildwood, N. J., assignors to A. C. Anderson, Inc., Wildwood, N. J., a corporation of New Jersey Application April 1, 1953, Serial No. 346,126

5 Claims. (Cl. 56—25)

This invention relates to mowing machines of the reciprocatory cutter or sickle bar type, and a principal object of the invention is to provide a mower of generally improved mechanical and functional characteristics.

Another object of the invention is to provide an improved mower unit adapted for attachment to a farm tractor, said unit being self-contained and fully operative independently of the tractor mechanism other than the use of the tractor engine as the prime mower or power source.

Still another object is to provide a mower mechanism of the stated type wherein the speed of mower actuation is substantially independent of the operating speed of the power source.

To this latter end, the invention contemplates provision of a novel hydraulic mower-actuating system comprising means for automatic control of mower speed independently of the rate at which the actuating fluid is supplied to the system.

More specifically, an object of the invention is to provide a hydraulic mower actuating system including a fluid motor for actuation of the cutting element of the mower, a pump for supplying the actuating fluid to the motor, and means for maintaining delivery of a substantially constant volume of the fluid to the motor independently of variations in the operating speed of the pump.

Still more specifically, the invention has for an object the provision of tractor mower wherein the operating speed of the cutter element is independent of the speed of operation of the tractor engine and of the travel of the tractor.

A further object is to provide in a system of the aforesaid characteristics a simple means for regulating or adjusting the speed of operation of the cutter.

A still further object is to provide a mower of the stated type wherein means is provided for lifting the cutter bar from the normal operating position, for the purpose of clearing obstructions or for regulating the height of cut above ground level, without material change in the parallel or angular relation of the bar to the horizontal.

Still another object is to provide a novel hydraulic cylinder lifting device for the cutter bar which allows the bar to lift when obstructions are encountered and which insures return of bar to its original position.

Another object is to provide a hydraulic mower operating system wherein the principal complement parts of the system are compactly and efficiently arranged to reduce to a minimum friction and heat in the hydraulic system.

A further object is to provide a hydraulically actuated mower wherein provision is made for a continuous flow of hydraulic fluid for simultaneous operation of the cutter blade and lift of the cutter bar.

The invention contemplates also, in a mower of the aforesaid properties, the use of a reversible cutter blade actuating motor with attendant advantages hereinafter described.

Another object is to provide a mower wherein the driving power is effectively balanced to the capacity of the cutting knife.

The invention resides also in certain other mechanical and structural features and details hereinafter described and illustrated in the attached drawings, wherein.

Figure 1:
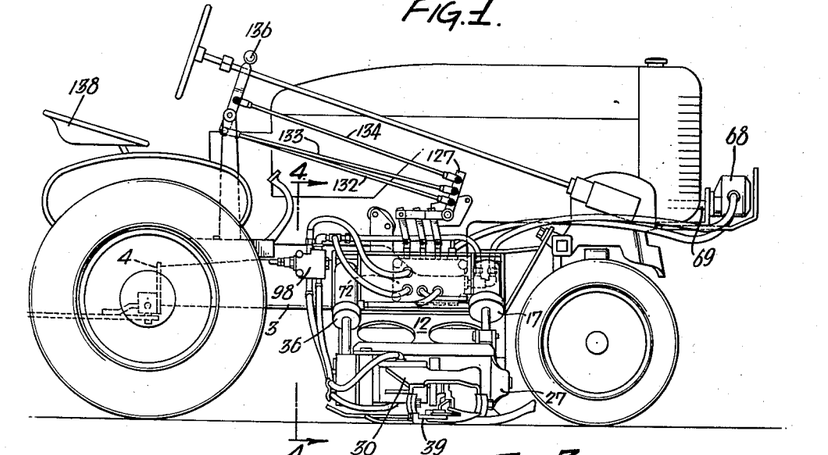
Figure 1 is a side elevational view of a tractor mower made in accordance with the invention.
Figures 2, 15, 16:
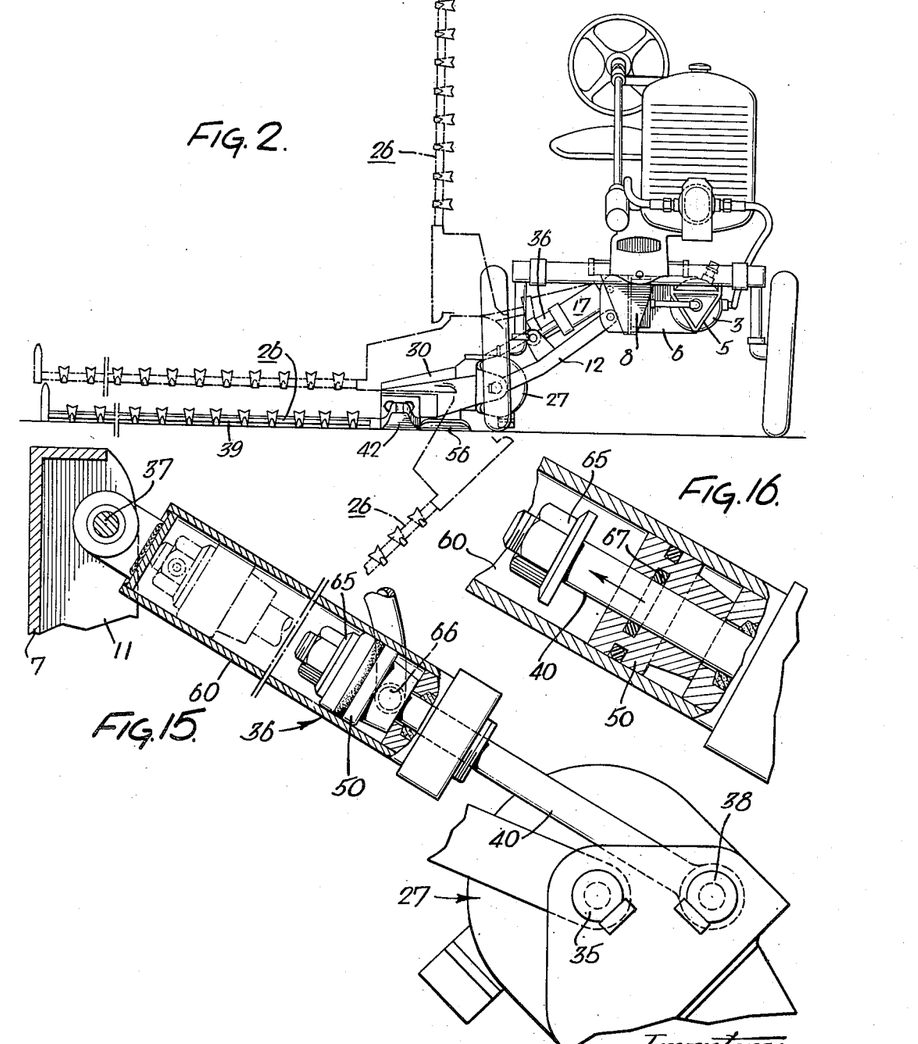
Figure 2 is a front elevational view of the tractor showing the cutter bar of the mower in three different positions of adjustment.
Figure 15 is a fragmentary elevational view with parts broken away and shown in section of the hydraulic lift cylinder for the cutter bar and blade assembly.
Figure 16 is a further enlarged fragmentary elevational view with parts broken away and shown in section of the lift cylinder.
Figures 3, 4:
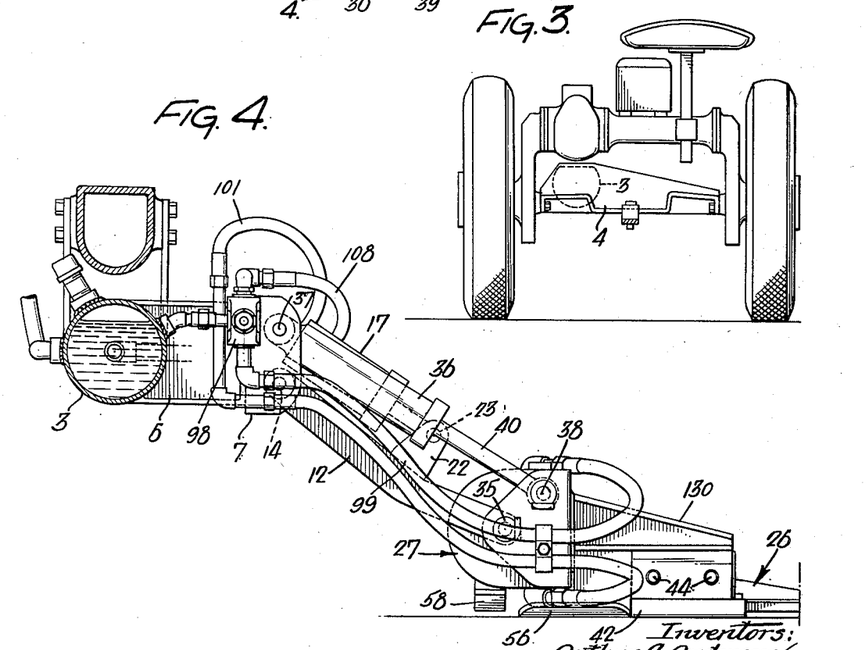
Figure 3 is a rear elevational view of the tractor illustrating the manner in which the mower unit is attached to the tractor frame.
Figure 4 is an enlarged sectional view on the line 4—4, Figure 1 and illustrates details of the mower unit.
Figures 8, 9, 10, 11:
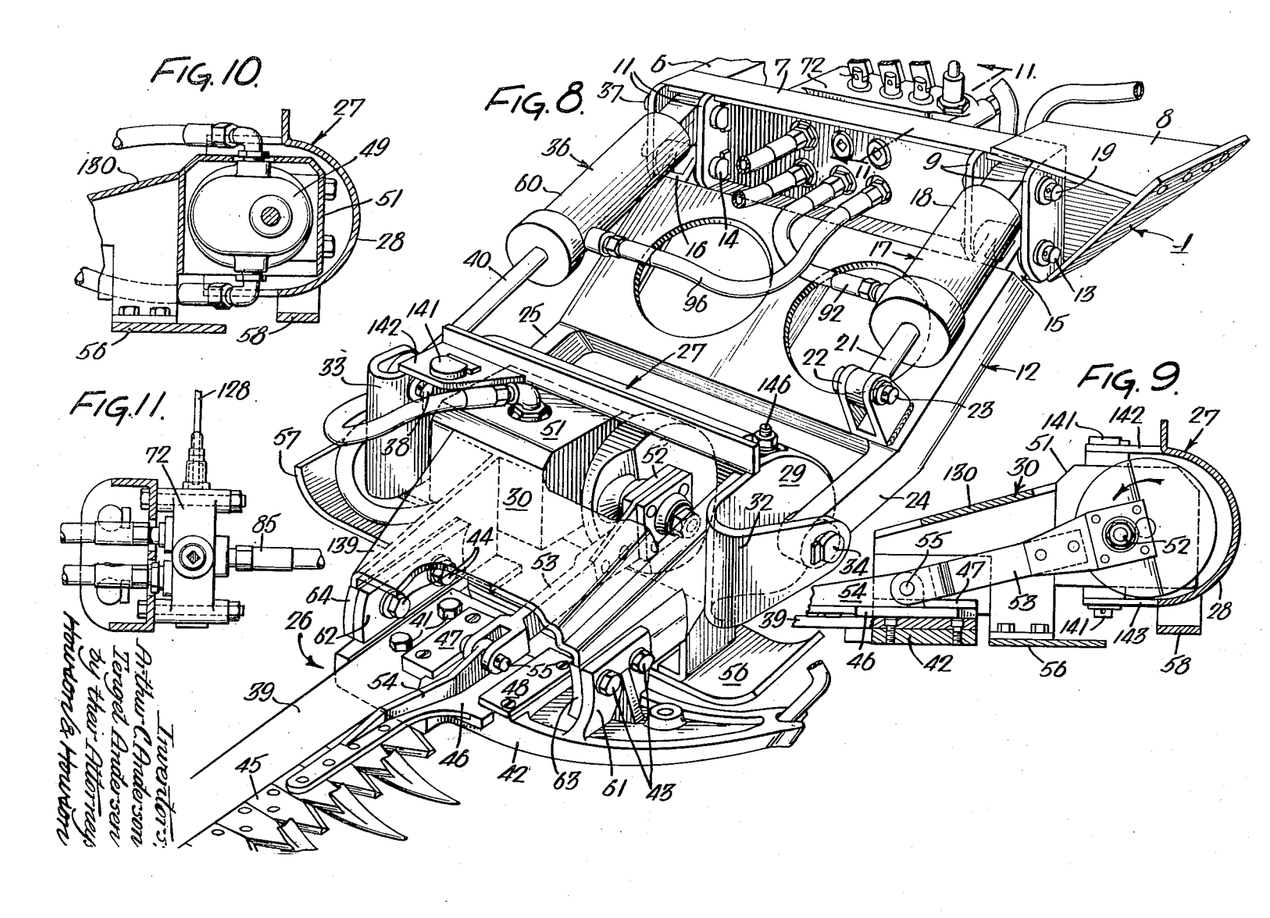
Figure 8 is an enlarged view in perspective of the mower unit.
Figure 9 is a sectional view on the line 9—9, Figure 5.
Figure 10 is a sectional view on the line 10—10, Figure 5.
Figure 11 is a sectional view on the line 11—11, Figure 8.
Figures 12, 13:
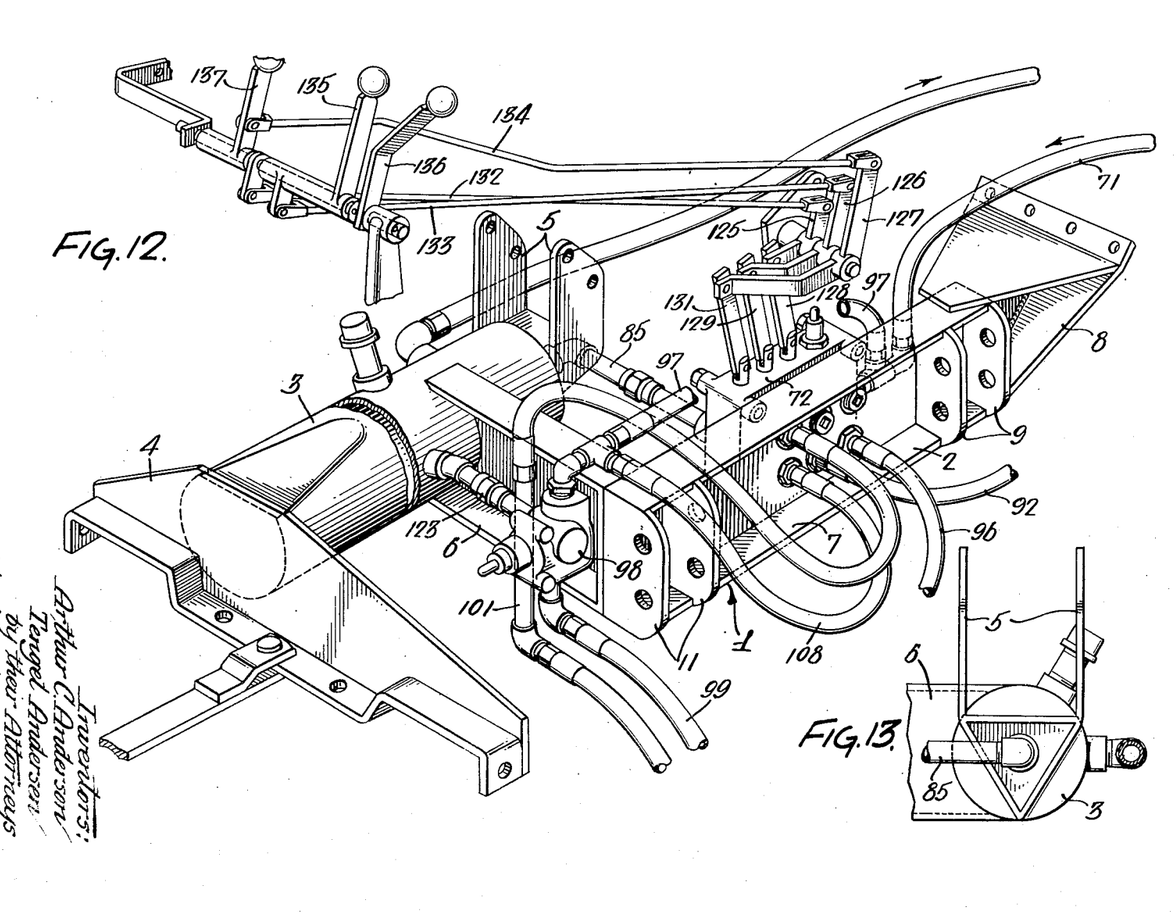
Figure 12 is an enlarged view in perspective of the body structure of the mower unit and of the immediately associated parts of the motor mechanism.
Figure 13 is an enlarged fragmentary end elevational view of the make-up tank of the hydraulic system forming an element of the body structure shown in Figure 12.

With reference first to Figures 8 and 12 of the drawings, which illustrate a preferred embodiment of our mower device, it will be noted that the mower mechanism per se takes the form of an independent or self-contained operating unit adapted for attachment as a unit to a suitable engine drive tractor. In the present instance the mower unit comprises a body structure 1 which is best shown in Figure 12. This structure comprises a fabricated frame work 2 which includes as parts thereof a cylindrical tank 3, brackets 4 and 5 secured respectively to the opposite ends of the tank, a channel member 6 secured to and projecting from one side of the tank, a second channel member 7, one end of which is secured to the outer end of the channel 6 and which extends laterally from the latter channel, and a terminal bracket 8 at the free end of the channel 7. As illustrated in Figure 12, the channel 7 comprises two sets of bracket flanges 9—9 and 11—11. This body member is adapted for attachment to the frame of a tractor, as illustrated in Figures 1, 2 and 3, and it will be noted that it occupies a position on the tractor well below the center of gravity and at the mid-section of the tractor and therefore operates to lower the center of gravity of the latter.

With reference more particularly to Figure 8 the mower unit comprises a plate-like member 12 which is pivotally secured on axially alined pins 13 and 14 to the brackets 9—9 and 11—11, the said member 12 having short arms 15 and 16 which lie between the bracket flanges 9—9 and 11—11 respectively and which are bored for reception of the pins 13 and 14. On these pins the member 12 is angularly adjustable with respect to the body structure in approximately vertical planes. Power means for effecting such adjustment of the member 12 is provided in the form of a piston and cylinder assembly 17, one end of the cylinder element 18 of this assembly being pivotally attached to the body structure between the flanges 9—9 by means of a pin 19, and the piston rod 21, which constitutes another element of the assembly, being pivotally attached to a bracket 22 on the member 12 by means of a pin 23. Fluid pressure applied to the lower end of the cylinder, as hereinafter described, will result in an elevation of the member 12 about the axis of the pins 13 and 14.

Figures 5, 7:
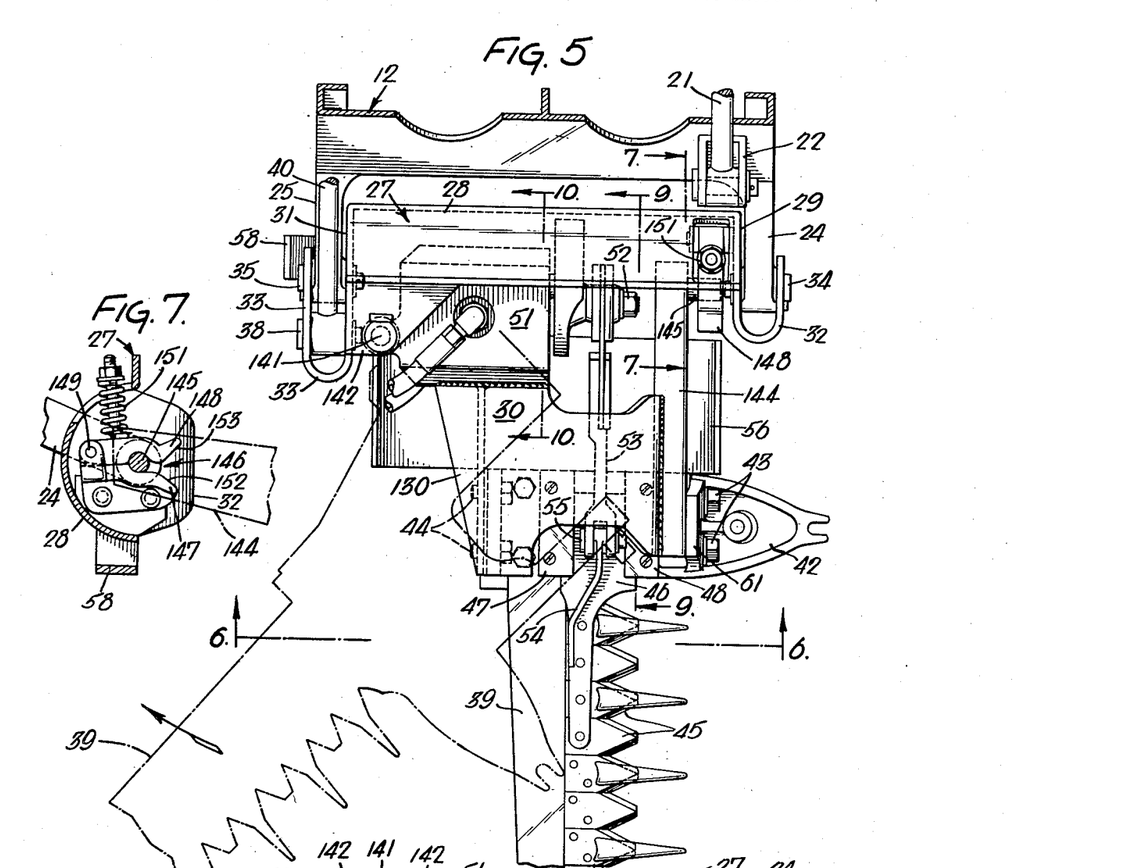
Figure 5 is an enlarged fragmentary top plan view of the mower unit.
Figure 7 is a sectional view on the line 7—7, Figure 5.
Figure 6:
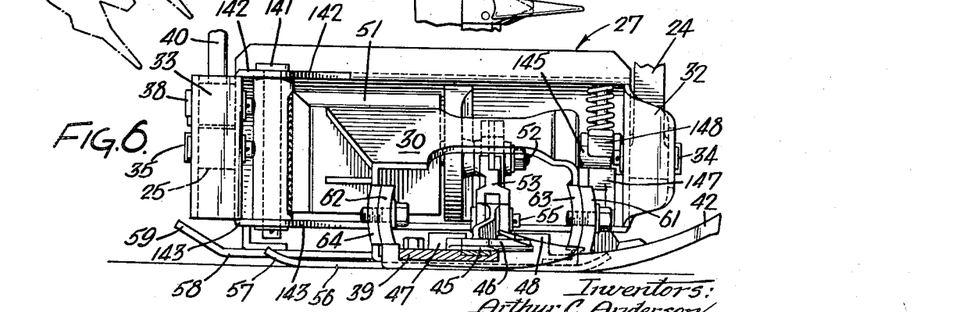
Figure 6 is a sectional view on the line 6—6, Figure 5.

The member 12 has at the outer edge thereof which lies opposite to its pivotal connection with the body structure, a pair of parallel arms 24 and 25, on and between which is pivotally mounted a cutter bar and blade assembly indicated generally by the reference numeral 26. This assembly comprises a base structure 27 having an arcuate rear wall 28 which terminates at each end in an end plate 29 and 31 respectively. The outer end of each of these plates 29 and 31 is turned outwardly and rearwardly to form a substantially U-shaped bracket, 32 and 33 respectively, one at each side of the frame to which the outer ends of the arms 24 and 25 of the member 12 are secured, see Figure 5, by means of pins 34 and 35 mounted in the sides of the U-shaped bracket, said pins providing a pivotal support for the bar and blade assembly 26 on the member 12. The pins 34 and 35 are aligned, as best shown in Figures 5 and 6, and the bar and blade assembly may be adjusted about the common axis of these pins in an approximately vertical plane corresponding in the present instance to the vertical plane of adjustment of the member 12 previously mentioned. Power means for effecting this adjustment of the bar and blade assembly with respect to the member 12 is provided in the form of a hydraulic piston and cylinder assembly 36 one end of which is pivotally attached to the body structure 1 between the bracket flanges 11—11 by means of a pin 37, and the other end of which is pivotally connected by a pin 38 between the sides of the U-shaped bracket 33. It will be noted by reference to Figure 4 that the piston and cylinder assembly 36 extends substantially parallel to the member 12 or to a line which intersects the centers of the pins 38 and 37, the purpose of this arrangement, wherein the assembly 36 and member 12 constitute substantially parallel links connecting the body structure and the cutter bar and blade assembly, being hereinafter described.

The cutter bar and blade assembly also comprises a conventional cutter bar 39 which is secured at one end, through the medium of screws or bolts 41, to a shoe 42 which in turn is secured by screws 43 and 44 to a bracket structure 30, this bracket being attached to the base structure 27 as hereinafter more specifically described. Cooperating with the bar 39 in the conventional manner is an elongated cutter blade 45, this blade being mounted for longitudinal reciprocation in the bar and in the shoe 42 wherein, as illustrated in Figure 8, an end bearing plate 46 of the blade is slidably mounted in guides formed by detachable plates 47 and 48. Reciprocation of the blade 45 is effected in the present instance by means of a hydraulic motor 49, see Figure 10, which is mounted in a housing 51 forming a part of the structure 30. This motor is connected through a crank 52 and a connecting rod 53 with an upstanding flange 54 on the end plate 46 on the cutter blade 45, the connection of the rod with the flange being by way of a wrist pin 55.

The cutter bar and blade assembly further comprises a second shoe 56 which lies inwardly of the shoe 42 and which like the shoe 42 has the end thereof which extends toward the normal forward direction of movement of the tractor and of the mower unit, upturned, the opposite end of the shoe 56 being similarly upturned as best illustrated at 57 in Figure 8. The shoe 56, also like the shoe 42, is attached to the bottom of and forms a part of the bracket structure 30. A third and relatively elevated shoe 58 lies rearwardly of the shoe 56 below the base structure 27 and forms a part of the latter structure, and the ends of this shoe are also upturned as illustrated at 59 in Figure 6. It will be noted by reference to this figure that the upturned flanges 61 and 62 of the shoe 42 through which the retaining screws 43 and 44 extend are concave and that the respective mating flanges 63 and 64 of the bracket 30 are similarly concave so that the weight of the shoe end of the cutter bar is taken in large degree directly upon the bracket structure 30 independently of the screws 43 and 44.

With reference now to the mounting of the cutter bar and blade assembly described above it will be noted that any adjustment of the member 12 about the axis of the pins 13 and 14 will result in a corresponding elevation or lowering of the cutter bar and blade assembly, and that by reason of the connection between the said assembly and the body structure through the piston and cylinder assembly 36 any adjustment of the cutter bar and blade assembly resulting from adjustment of the member 12 will be such that the cutter bar remains substantially parallel to the position from which the adjustment originated. This results from the parallel relationship between the cylinder and piston assembly 36 and the member 12 described above, the said member and the cylinder assembly constituting a parallelogram which in any adjustment of the cutter bar and blade assembly about its pivotal connection with the said member which maintains the cutter bar in the aforesaid parallel relation to its original position. This parallel adjustment of the cutter bar is illustrated in Figure 2 wherein the bar is shown in full lines in a normal cutting position at ground level, the bar being also shown in broken lines in an elevated position to which it has been moved by actuation of the piston-cylinder assembly 17 and consequent adjustment of the member 12 about the pins 13 and 14. In this movement the piston-cylinder assembly 36 functions solely in its capacity as a link connecting the cutter bar with the body structure and operative in conjunction with the parallel link established by the member 12 to preserve the original substantially horizontal position of the bar in the adjusted elevated position.

It will be evident also that by actuation of the piston-cylinder assembly 36 the cutter bar assembly may be adjusted angularly about the pins 34 and 35. The extent of such adjustment, as illustrated in Figure 2, is in the present instance between a position approximately 45° below horizontal and a position approximately 90° above horizontal. This adjustment of the cutter bar is accomplished by individual operation of the piston-cylinder assembly 36, the member 12 remaining in the position to which it has previously been adjusted through the medium of the piston-cylinder assembly 17.

With reference to Figures 15 and 16 it will be noted that the piston rod 40 of the assembly 36 is slidably associated with the piston 50 of this assembly. Thus, whereas the inner end of the rod carries a nut 65 which forms a seat for the piston 50 on the inner end of the rod, so that fluid pressure introduced at the port 66 of the cylinder 60 will force the piston and rod upwardly in the cylinder toward the position indicated in broken lines, the piston rod 40 is free to move inwardly of the cylinder in any position of the piston except where the latter is at the extreme upper end of its movement. This relative movement of the piston rod with respect to the piston is illustrated in Figure 16 wherein it will be noted that the sliding joint between the rod and piston is sealed by a suitable packing element 67. The piston-cylinder assembly 17 is similarly formed so that in that case also the piston rod 21 is free to move inwardly of the piston entirely independently of the piston. The purpose of this device is to provide for free upward swing of the cutter bar assembly under the deflecting action of an obstruction engaging either the bar or any of the shoes 42, 56, and 58. It will be apparent also that any such upward deflection of the cutter bar assembly will not interfere with the subsequent return of the cutter bar assembly to its original operating position and the device will in fact insure an accurate return of the assembly to said original position.

Figure 14:
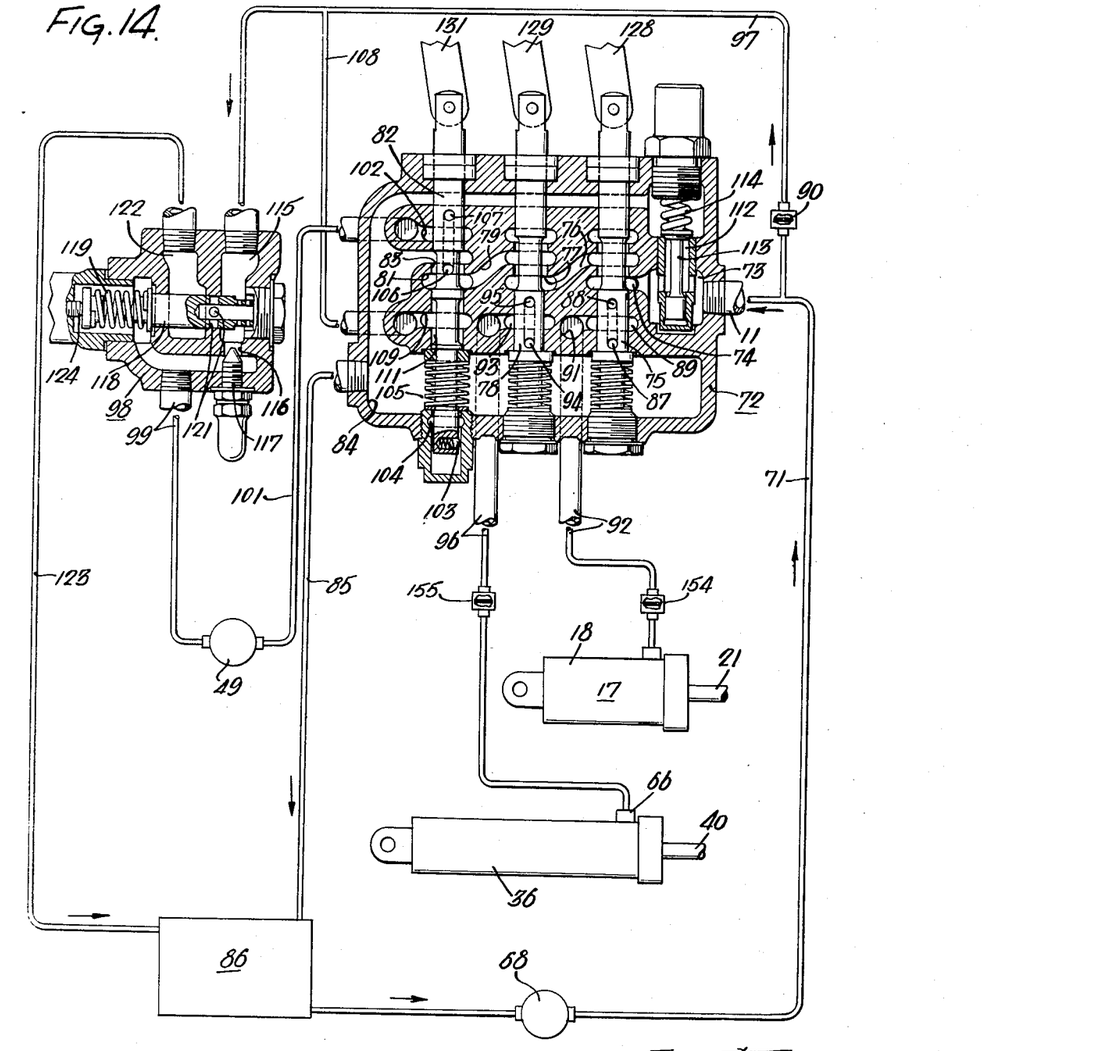
Figure 14 is a diagrammatic view of the hydraulic system showing the manual control and automatic speed regulating valve units in vertical section.

With reference to Figures 1 and 14 it will be noted that the mower device comprises, as an essential element of the self-contained unit, a pump 68 which in the present instance is shown mounted at the front of the tractor and connected through a shaft 69 with the tractor engine (not shown). This pump is connected in a fluid system which includes the aforesaid motor 49 and the hydraulic lift cylinders 17 and 36. The system is illustrated diagrammatically in Figure 14 wherein the pump is shown connected through a pipe 71 with a valve casing 72 which houses the manually actuated valves through which the operations of the said cylinders and motor are controlled. The pipe 71 communicates directly with a chamber 73 in the casing 72 which communicates in turn with a valve chamber 74 in which is slidably mounted a valve element 75. The chamber 74 in turn is connected through a port 76 with a second valve chamber 77 in which is slidably mounted a valve element 78. The chamber 77 is connected through a port 79 with a third valve chamber 81 which contains a slidably adjustable valve element 82. The chamber 81 has a port 83 which connects that chamber with a sump chamber 84 in the bottom of the casing 72 and this chamber is connected through a pipe 85 with a make-up tank 86. When the valves 75, 78 and 82 are in neutral position, as illustrated in Figure 14, operation of the pump will cause circulation of the actuating fluid from the tank 86 to and through the pump, through the pipe 71, chambers 73, 74, 77 and 81, port 83 and sump chamber 84 back to the tank 86. If the valve 75 is elevated from this neutral position, the communicating ports 87 and 88 in this valve will establish communication between the chamber 74 and a chamber 89 in the casing 72. This latter chamber is connected through a port 91 and a pipe 92 with the lift cylinder 17 previously described, and pressure fluid entering this cylinder from the pump 68 will cause a retractive movement of the associated piston and piston rod 21 to elevate the member 12 about the axis of the pivots 13 and 14. When after a given retractive movement of the piston, the valve 75 is returned to the neutral position, as in Figure 14, the chamber 89 will be closed off so that the fluid trapped in the cylinder will maintain the piston in the retracted or partially retracted position. Release of the piston to permit the member 12 to move downwardly about the axis of the pivots 13 and 14, may be effected by depressing the valve element 75 from the neutral position so as to connect the chamber 89 with the sump chamber 84 through the ports 87 and 88.

The valve element 78 operates in a similar manner with respect to the cylinder 36, it being noted that this element when elevated from the neutral position in which it is shown in Figure 14, will connect the chamber 77 with a chamber 93 in the casing 72 by way of interconnected ports 94 and 95 in the valve element. Pressure fluid then flows through a pipe 96 to the cylinder 36 to cause a retractive movement of the plunger 50 and an elevation of the cutter bar assembly about the pivots 35 and 34. Return of the valve element 78 to neutral position closes the chamber 93 and maintains the piston in the adjusted position; and depression of the valve element below the neutral position will connect the chamber 93 with the sump chamber 84 and will permit exhaust of the actuating fluid from the cylinder and return movement of the piston 50 toward the lower end of the cylinder, so that the cutter bar assembly is lowered.

The valve element 82 provides for directing the flow of pressure fluid through the motor in a direction reverse to the normal direction of flow with the resultant reversal of the direction of motor operation. To this end the motor is of the reversible type. Normally, with the valve element 82 in the neutral position shown in Figure 14, actuating fluid from the pump will pass freely from the chamber 81 through the port 83 to the sump 84 and thence through the pipe 85 to the tank 86. Pressure fluid is then supplied to the motor by way of a bypass 97, which contains a metering orifice 90, the automatic control valve unit 98, and a pipe 99. The motor, however, will be inoperative by reason of the fact that its exhaust is connected through a pipe 101 to a chamber 102 in the valve casing 72, which chamber, in the neutral position of valve 82, is closed.

Operation of the motor 49 to actuate the cutter bar assembly in the normal direction, indicated by the arrow in Figure 9, may be effected by elevating the valve element 82 from the said neutral position so as to connect the chamber 102 with the sump chamber 84. In the elevated position of the valve a spring pressed detent 103 will enter a recess 104 in the wall of the casing and will act to retain the valve releasably in the elevated position against the tendency of a spring 105 to return the valve to neutral. This represents the normal operating position of the valve which will effect the operation of the motor in the direction indicated by the arrow in Figure 9.

If now it be desired to reverse the operation of the cutter blade by reversal of the motor 49, the valve element 82 is depressed below the neutral position so as to connect the chamber 81 with the chamber 102, this by way of interconnected ports 106 and 107 in the valve element. In this depressed position of the valve the pipe 97 is directly connected with the sump 84 through a bypass pipe 108, a chamber 109 in casing 72 with which the pipe 108 is connected, and a port 111 which when the valve is depressed connects the chamber 109 with the sump chamber. This diverts any pressure fluid from the pump passing through pipe 97 to the valve casing 72 and thence to the make-up tank 86 and bypasses the valve 98. At the same time the other side of the motor 49 which now constitutes the discharge side is connected through the pipe 99 and the valve 98 with the bypass 108 and through this bypass with the sump 84.

Reversal of the cutter blade 45 is desirable, on occasion, to clear the cutting teeth of obstruction, but it is undesirable to operate the pump and cutter blade reversely for any substantial period of time by reason of the unfavorable leverage reaction inherent in rotation of the crank 52 in the reverse direction under operating conditions. It will be noted that in the present instance the reversal of the motor 49 can be effected only by depressing the valve element 82 against the pressure of the spring 105 and by maintaining the valve element in the depressed condition manually. By this means possibility of inadvertent operation of the motor in reverse direction for any undesirable length of time is avoided.

The chamber 73 of the valve casing 72 has a port 112 through which that chamber may be connected with the sump chamber 84. This port, however, is normally closed by a valve 113 which is held to its seat by a spring 114. The pressure of this spring is sufficient to hold the valve seated against any normal operating pressure in the pump line but under abnormal pressure will permit the valve 113 to open to bypass the actuating fluid to the sump, this valve thereby constituting a safety valve precluding damage to the system.

The automatic control valve unit 98 (Fig. 14) effects an automatic regulation of the volume of the actuating fluid normally passing to the motor 49 and acts to maintain a constant motor speed regardless of variations in the speed of operation of the positive displacement pump 68 or in the discharge or motor back pressures. Pressure fluid entering the chamber 115 of the valve unit 98 passes through an orifice 116, the cross sectional area of which may be regulated by a stationary adjustable valve element 117, to the pipe 99 and motor 49. If the pressure in the chamber 115 increases, a valve 118 in the casing of valve unit 98 will be forced to the left, as viewed in Figure 14, against the pressure of a spring 119 and will thereby permit flow of a part of the pressure fluid from the chamber 115 through the ports 121 into a chamber 122 of the valve casing which is connected by way of a pipe 123 with the make-up tank 86. The pressure of the spring 119 on the valve element 118 may be regulated through the medium of an adjusting screw 124. If the pressure of the spring 119 is equal to the difference in the fluid pressures at opposite sides of the orifice 116 exerted on the opposite ends of the valve element 118, the said element may have a normal operating position as shown in Figure 14 from which it will be moved only to compensate pressure rise in the chamber 115, due for example to pump acceleration with the tractor engine.

Increased back pressure of the motor, arising from heavy cutting resistance on the cutter bar, will be accompanied by a correspondingly increased pressure in the chamber 115. In either case, the effect is to maintain a constant motor and cutter blade speed.

If the spring adjustment is such that the element 118 assumes a normal operating position wherein the ports 121 are partially exposed in chamber 122, the valve will act to maintain the constant volume delivery to the motor in response to falling as well as to rising pressures in the chamber 115. Falling pressure will result in a reduction in the area of the ports 121 exposed in the chamber 122 and will thereby permit build up of pressure in the chamber 115 and maintainance of the difference in pressures at opposite sides of the orifice 116. Abnormal pressure in chamber 115 will cause the element 118 to move to the left with resulting increased flow to chamber 122 and relief of the abnormal pressure. In its application to a mower mechanism of the type herein described the device affords a substantially constant operating speed for the cutter bar irrespective of variations in the operating speed of the pump 68 resulting from corresponding speed variations in the operation of the tractor engine which constitutes the prime mover for the pump. Its presence in the system also permits use of a pump having a discharge capacity materially in excess of the requirements of the system so that the lift devices may be operated simultaneously with the motor without appreciable effect upon the motor speed. The metering orifice 90 in pipe 97, and, similar metering orifices 154 and 155 in the pipes 92 and 96 respectively, insure proper distribution of pressure fluid from the pump to the motor and the lift units 17 and 36.

It will be noted that in the several figures of the drawings the various elements of the hydraulic system shown in Figure 14 have been identified by the same reference numerals.

Means is provided, as best illustrated in Figure 12, for selective operation of the valve elements 75 and 78, and of the motor control valve element 82. Each of these valve elements projects through the top wall of the casing 72 which is secured to the back of the channel member 7 of the body structure, and each of the projecting ends is connected with an individual bell crank lever designated respectively by the reference numerals 125, 126 and 127 through the medium of links 128, 129 and 131. The respective bell crank levers are connected by rods 132, 133 and 134 to operating handles 135, 136 and 137 which are located in suitably accessible positions in proximity to the operator's seat 138 (see Figure 1) of the tractor.

Means is provided for permitting a rearward movement of the cutter bar when in operation the bar meets an obstruction. To this end the bracket structure 30 which comprises the housing 139, and, as previously set forth, the shoes 42 and 56, the pump housing 51, and the crank 52, is connected to the base structure 27 through the medium of a vertical pivot pin 141 so that it may swing about this pivot rearwardly with respect to the direction of normal forward travel, as indicated in broken lines in Figure 5. The pivot pin 141 is mounted at one side of the assembly in proximity to and inwardly of the bracket 33 in flanges 142 and 143 of the base structure 27, as shown in Figures 6 and 9. The opposite side of the bracket structure 30 comprises an arm 144 which carries at its rear end a transversely projecting pin 145, and when the cutter bar assembly is in the normal operating condition, this pin engages in and is retained by a spring press clip 146 on the base structure, see Figure 7. This clip comprises a fixed jaw 147 and an opposed pivoted jaw 148, the latter being moveable about a pin 149, and being pressed toward the jaw 147 by an adjustable spring 151. Normally the jaws are effective to hold the cutter bar in operative position against the rearward thrusts, but will be forced open by camming action of the pin 145 when the thrusts exceed a predetermined maximum to release the cutter bar and its supporting bracket for the rearward relief movement about the pivot 141. As shown, the jaws have confronting inwardly converging faces 152—153 to guide the pin 145 back into place between the jaws when the cutter bar is returned to the normal operating position.

We claim:

1. A mower unit comprising, in combination, a cutter bar and reciprocable blade assembly; a hydraulic operating system for the blade including a hydraulic motor and a power-operated positive-displacement pump connected to the motor to drive the same; mechanism for operatively connecting the motor to the blade to operate the blade; and an automatic control valve unit in said hydraulic operating system and connected to the motor and pump, said unit effecting automatic regulation of the volume of the actuating fluid normally passing to the motor from the pump and acting to maintain a substantially constant motor speed independently of variations in the operating speed of the pump or in the discharge or motor back pressures.

2. A mower unit as defined in claim 1 including a valve casing connected to the discharge side of the pump and to the intake side of the motor, said valve casing having a sump therein, and a spring-seated valve in said valve casing which remains closed during normal operating pressure and which opens under abnormal operating pressure to bypass the actuating fluid to the sump, thereby acting as a safety valve precluding damage to the hydraulic operating system.

3. A mower unit as defined in claim 1 including a valve in the hydraulic operating system which is manually operable to control the direction of movement of the hydraulic motor, thereby to effect operation of the blade in the normal manner or to reverse the motor and hence the direction of reciprocation of the blade.

4. A mobile power mower unit comprising in combination, a cutter bar and reciprocable blade assembly; a hydraulic operating system for the blade including a power driven pump, a motor, and conduit means connecting the pump to the motor to drive the motor; mechanism operatively connecting the motor to the blade to reciprocate the blade; and means in said hydraulic operating system responsive to variations in the back pressures imposed on the motor through the blade to maintain a substantially constant volume of flow of the actuating fluid from the pump to the motor independently of said variations and, hence, a constant motor speed, said last-mentioned means including a valve casing connected by conduits to the pump and motor, said casing having a valve seat therein, and a spring-pressed valve in operative relationship to said valve seat, said spring-pressed valve being movable in response to increased pressure of the actuating fluid in the casing to permit bypassing flow of a portion of said fluid to the intake side of the pump, the greater the increase of pressure of said fluid within the casing, the greater the extent of opening of said spring-pressed valve and the greater the bypassing flow of the actuating fluid to the intake side of the pump.

5. A mobile power mower unit as defined in claim 4 wherein said valve casing has an orifice therein and a valve element in operative relationship to said orifice, said valve element being stationary and having means accessible from the outside of said valve casing for adjusting said valve element to regulate the effective area of said orifice, said orifice controlling the flow of actuating fluid through said valve casing other than the bypassing flow.

References Cited in the file of this patent
UNITED STATES PATENTS

| | | |
|---|---|---|
| 1,790,072 | Pearson | Jan. 27, 1931 |
| 1,797,957 | Horste | Mar. 24, 1931 |
| 1,939,851 | Horste | Dec. 19, 1933 |
| 1,947,552 | Huddle | Feb. 20, 1934 |
| 1,958,405 | Anthony et al. | May 15, 1934 |
| 2,166,967 | Raney et al. | July 25, 1939 |
| 2,171,761 | Paradise et al. | Sept. 5, 1939 |
| 2,232,823 | Hull | Feb. 25, 1941 |
| 2,236,598 | Hautzenroeder | Apr. 1, 1941 |
| 2,248,332 | Budelier et al. | July 8, 1941 |
| 2,291,987 | Rodgers | Aug. 4, 1942 |
| 2,314,215 | Hilblom | Mar. 16, 1943 |
| 2,324,563 | Custenborder | July 20, 1943 |
| 2,411,623 | Jaques | Nov. 26, 1946 |
| 2,457,693 | Leicy | Dec. 28, 1948 |
| 2,588,003 | Holmes | Mar. 4, 1952 |
| 2,588,004 | Holmes | Mar. 4, 1952 |
| 2,609,650 | Lindquist | Sept. 9, 1952 |
| 2,663,133 | Davis | Dec. 2, 1953 |
| 2,686,998 | Miller et al. | Aug. 24, 1954 |